US011591238B2

(12) United States Patent
Tachikawa

(10) Patent No.: US 11,591,238 B2
(45) Date of Patent: Feb. 28, 2023

(54) ALKALINE EARTH METAL TITANATE CRYSTAL LAMINATE

(71) Applicant: JAPAN SCIENCE AND TECHNOLOGY AGENCY, Kawaguchi (JP)

(72) Inventor: Takashi Tachikawa, Nishinomiya (JP)

(73) Assignee: JAPAN SCIENCE AND TECHNOLOGY AGENCY, Kawaguchi (JP)

( * ) Notice: Subject to any disclaimer, the term of this patent is extended or adjusted under 35 U.S.C. 154(b) by 225 days.

(21) Appl. No.: 16/647,333

(22) PCT Filed: Sep. 14, 2018

(86) PCT No.: PCT/JP2018/034156
§ 371 (c)(1),
(2) Date: Mar. 13, 2020

(87) PCT Pub. No.: WO2019/054474
PCT Pub. Date: Mar. 21, 2019

(65) Prior Publication Data
US 2020/0346941 A1    Nov. 5, 2020

(30) Foreign Application Priority Data

Sep. 15, 2017   (JP) .............................. JP2017-177321

(51) Int. Cl.
*B32B 5/16*   (2006.01)
*C01G 23/00*  (2006.01)
(Continued)

(52) U.S. Cl.
CPC ............ *C01G 23/006* (2013.01); *B01J 23/02* (2013.01); *B01J 35/006* (2013.01); *B01J 37/10* (2013.01);
(Continued)

(58) Field of Classification Search
CPC ................ Y10T 428/24893; Y10T 428/24942
(Continued)

(56) References Cited

U.S. PATENT DOCUMENTS

| 5,406,445 A | 4/1995 | Fujii et al. |
| 2015/0059818 A1 | 3/2015 | Koumoto et al. |
| 2016/0001268 A1* | 1/2016 | Majima .................. B01J 23/755 |
| | | 428/329 |

FOREIGN PATENT DOCUMENTS

| JP | 6-333772 A | 12/1994 |
| JP | 2012-188335 A | 10/2012 |

(Continued)

OTHER PUBLICATIONS

Dutta & Gregg, Hydrothermal Synthesis of Tetragonal Barium Titanate, Chern. Mater. 1992, 4, 843-846 (Year: 1992).*

(Continued)

*Primary Examiner* — Hoa (Holly) Le
(74) *Attorney, Agent, or Firm* — Oblon, McClelland, Maier & Neustadt, L.L.P.

(57) ABSTRACT

There are provided a new type of crystal laminate of an alkaline earth metal titanate having improved catalytic activity, and a method for producing the same. The crystal laminate is provided having a crystal of the alkaline earth metal titanate as a constitutional unit, wherein the crystal being the constitutional unit is a cubic crystal, a tetragonal crystal or an orthorhombic crystal; the crystal being the constitutional unit has a primary particle diameter of 500 nm or less; and the crystal is layered with an orientation in a {100} plane direction thereof.

3 Claims, 17 Drawing Sheets

(51) Int. Cl.
    B01J 23/02    (2006.01)
    B01J 35/00    (2006.01)
    B01J 37/10    (2006.01)
    B82Y 30/00    (2011.01)
(52) U.S. Cl.
    CPC ........... B82Y 30/00 (2013.01); C01P 2002/34
            (2013.01); C01P 2002/60 (2013.01); C01P
            2004/38 (2013.01); C01P 2004/39 (2013.01);
            C01P 2004/64 (2013.01); C01P 2006/12
            (2013.01)
(58) Field of Classification Search
    USPC ........................................ 428/206, 212, 220
    See application file for complete search history.

(56)                References Cited

FOREIGN PATENT DOCUMENTS

JP      WO 2013/115213 A1    8/2013
JP         2015-48251 A      3/2015
WO      WO 2014/119117 A1    8/2014

OTHER PUBLICATIONS

Shi et al., Crystallographic Properties of Hydrothermal Barium Titanate Crystallites, J. Am. Ceram. Soc., 80, [6] 1567-72 (1997) (Year: 1997).*
Kalyani et al., Hydrothermal Synthesis of SrTiO3 Mesocrystals: Single Crystal to Mesocrystal Transformation Induced by Topochemical Reactions, Cryst. Growth Des. 2012, 12, 4450-4456 | dx.doi.org/10.1021/cg300614f (Year: 2012).*
Translation of WO 2013-115213 (Year: 2013).*
Tachikawa, T. et al., "Unique charge transfer behavior on strontium titanate mesocrystal photocatalysts", Abstracts of Annual Meeting on Photochemistry, Sep. 4, 2017, 1C18, 5 total pages.
Tachikawa, T et al., "Synthesis of strontium titanate crystal and its application to water decomposition photocatalyst", Abstracts of 36th Catalytic Chemistry Symposium in Association With Light, Jun. 30, 2017, pp. 23-24.
Zhang, P. et al., "Topotactic Epitaxy of $SrTiO_3$ Mesocrystal Superstructures with Anisotropic Construction for Efficient Overall Water Splitting", Angewandte Chemie International Edition, Apr. 6, 2017, vol. 56, No. 19, 14 total pages.
Japan Science and Technology Agency, "Photocatalyst makes hydrogen production 10 times more efficient" [Online], Apr. 10, 2017, [Retrieved on Dec. 4, 2018], <URL:http://www.jst.go.jp/pr/announce/20170410/index.html> (with its English version <http://www.kobe-u.ac.jp/research_at_kobe_en/NEWS/news/2017_05_01_01.html>), 16 total pages.
Song, R.-Q. et al., "Mesocrystals—Ordered Nanoparticle Superstructures", Advanced Materials, 2010, vol. 22, pp. 1301-1330.
Zhou, L. et al., "Mesocrystals—Properties and Applications", The Journal of Physical Chemistry Letters, 2012, vol. 3, pp. 620-628.
Abstracts of 97th Spring Annual Meeting (2017)Collaboration planning, The Chemical Society of Japan, JST CREST and PREST "Super space control" Joint Symposium(JST), p. 15 & CREST and PREST "Super space control" Joint Symposium(JST)—"Innovative functions and new materials developed by superspace" (Keio University Hiyoshi Campus), published on Mar. 18, 2017, 11 total pages.
International Search Report dated Dec. 18, 2018 in PCT/JP2018/034156 filed on Sep. 14, 2018, 2 pages.
Declaration as to Non-prejudicial Disclosures of Exemptions to Lack of Novelty issued Oct. 4, 2017 in corresponding Japanese Patent Application No. 2017-177321 (with English translation), 10 pages.

* cited by examiner

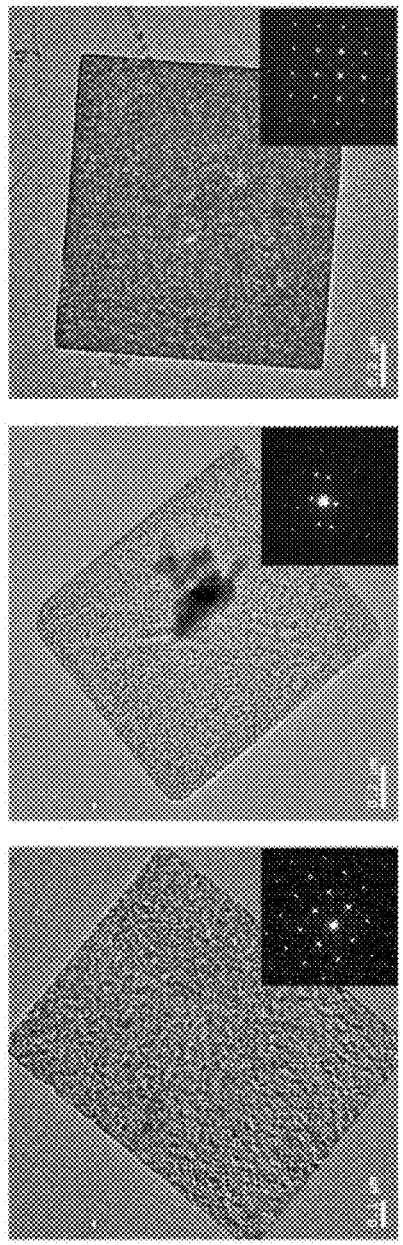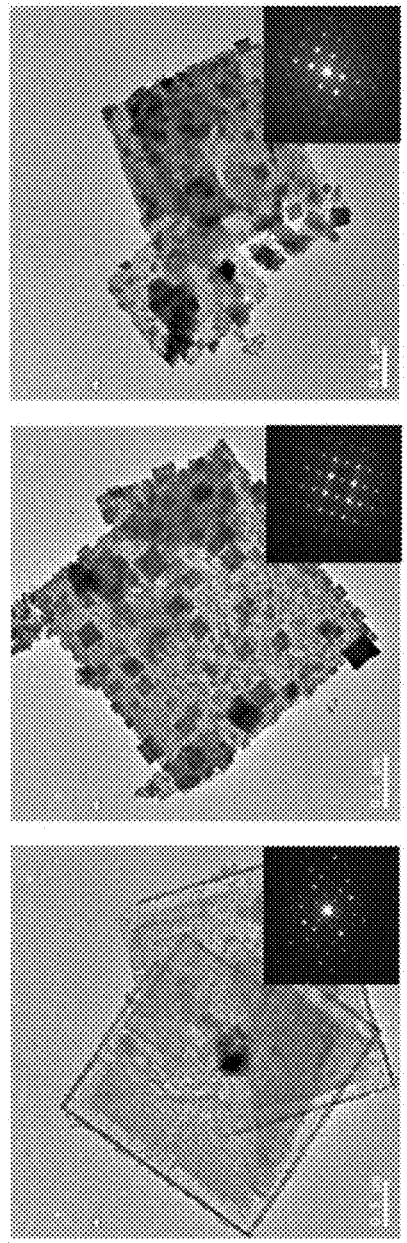

ALKALINE EARTH METAL TITANATE CRYSTAL LAMINATE

TECHNICAL FIELD

The present invention relates to an alkaline earth metal titanate crystal laminate.

BACKGROUND ART

Alkaline earth metal titanates such as strontium titanate and barium titanate have photocatalytic activity and high dielectricity, and are used for photohydrolysis, ceramic capacitors, piezoelectric elements and the like. Nanoparticles of metal titanates, however, are liable to randomly aggregate, and the decrease in surface area, the interfacial mismatch and the like caused thereby pose the following problem: the decrease in photocatalytic activity and light energy conversion efficiency.

As means for solving the above problem, with regard to metal oxide nanoparticles, reported were means in which metal oxide nanoparticles are made into a metal oxide mesocrystal, which is a superstructure made by self-organization of the metal oxide nanoparticles (Non Patent Literatures 1 and 2). The present inventor has further studied in order to conveniently obtain a mesocrystal of a metal oxide represented by titanium oxide, and has then found that by calcining using an aqueous solution containing a metal oxide precursor, an ammonia salt and water, or a metal oxide precursor, an ammonia salt, a surfactant and water, a metal oxide mesocrystal having a large size and a large specific surface area can be obtained (Patent Literatures 1 and 2). It has also been found that a mesocrystal of a composite oxide containing two or more metal species can also be obtained (Patent Literature 2).

CITATION LIST

Patent Literature

Patent Literature 1: International Publication No. WO2013/115213
Patent Literature 2: International Publication No. WO2014/119117

Non Patent Literature

Non Patent Literature 1: R.-Q. Song et al., Adv. Mater. 22, 1301-1330 (2010)
Non Patent Literature 2: L. Zhou et al., J. Phys. Chem. Lett. 3, 620-628 (2012)

SUMMARY OF INVENTION

Problem to be Solved

Conventional mesocrystal production technologies, however, relate mainly to production of metal oxide mesocrystals of single metal species, and in the case of applying the technologies to oxides (hereinafter, composite oxides) containing two or more metal species like alkaline earth metal titanates, the technologies sometimes form solid solutions and have difficulty in control of compositions. Further, the obtained composite oxides, though having a large size and specific surface area of their crystals, do not have a crystal system and an electronic structure suitable to the catalytic reaction, particularly to the photocatalytic reaction, and do still not exhibit fully satisfactory catalytic activity.

Therefore, an object of the present invention is to provide a new type of crystal laminate of an alkaline earth metal titanate having improved catalytic activity, and a method for producing the same.

Solution to Problem

Then, as a result of studies by the present inventor to obtain a crystal laminate having alkaline earth metal titanate nanoparticles grown in a controlled direction, by first obtaining titanium oxide mesocrystals by a method of Patent Literatures 1 and 2, and then adding an alkaline earth metal source to the crystals and bringing the resultant into a hydrothermal reaction, there are obtained: the crystal laminate in which alkaline earth metal titanate crystals are epitaxially grown from the titanium oxide mesocrystals behaving as a template and the crystals are oriented in the {100} plane direction; and a structure having the alkaline earth metal titanate nanoparticles on the surface of the crystal laminate. Then, it has been found that the photohydrolysis reaction activity is greatly improved by the crystal laminate and the structure, and this finding has led to the completion of the present invention.

That is, the present invention provides the following [1] to [9].

[1] A crystal laminate comprising a crystal of an alkaline earth metal titanate as a constitutional unit, wherein:
the crystal being the constitutional unit is a cubic crystal, a tetragonal crystal or an orthorhombic crystal;
the crystal being the constitutional unit has a primary particle diameter of 500 nm or less; and
the crystal is layered with an orientation in a {100} plane direction thereof.
[2] The crystal laminate according to [1], wherein the crystal laminate has an average width of 1 μm or more.
[3] The crystal laminate according to [1] or [2], wherein the crystal laminate has an average thickness of 50 nm or more.
[4] The crystal laminate according to any one of [1] to [3], wherein the crystal present on a surface of the crystal laminate has a primary particle diameter more than a primary particle diameter of the crystal present in an interior of the crystal laminate.
[5] The crystal laminate according to any one of [1] to [4], wherein the crystal laminate has a specific surface area of 10 $m^2/g$ or more.
[6] A structure having an alkaline earth metal titanate crystal nanoparticle on a surface of the crystal laminate according to any one of [1] to [5], wherein
a crystal orientation of the nanoparticle is in the same direction as that of the crystal laminate.
[7] The structure according to [6], wherein the nanoparticle has a primary particle diameter of twice or more a primary particle diameter of the crystal present on the surface of the crystal laminate.
[8] The structure according to [6] or [7], wherein the nanoparticle has a primary particle diameter of 50 nm or more.
[9] A method for producing a crystal laminate of an alkaline earth metal titanate, comprising:
subjecting a titanium oxide mesocrystal having a titanium oxide nanoparticle orderly layered therein and an alkaline earth metal atom source to a hydrothermal reaction.

Effects of Invention

The crystal laminate and the structure of the present invention are more greatly improved in the catalytic activity than alkaline earth metal titanate nanoparticles, and are useful as catalysts for photohydrolysis reaction and photohydrogen generation reaction. The crystal laminate and the structure of the present invention can easily be produced by using titanium oxide mesocrystals as a template.

BRIEF DESCRIPTION OF DRAWINGS

FIGS. 3A to 3F TEM images of TMC, SMC-12, SMC-24, SMC-36, SMC-48 and SMC-60.

DESCRIPTION OF EMBODIMENTS

The crystal laminate of the present invention is a crystal laminate comprising a crystal of an alkaline earth metal titanate as a constitutional unit.

The alkaline earth metal titanate includes strontium titanate, barium titanate, calcium titanate and radium titanate, and strontium titanate, barium titanate and calcium titanate are more preferable; strontium titanate and barium titanate are still more preferable; and strontium titanate is further still more preferable. One or two or more of the alkaline earth metal titanates may be contained, and preferably one thereof may be contained. This is because rather one thereof can be expected to provide improvement in activity as a photocatalyst. This is also because one thereof is more unlikely to form a solid solution than two or more thereof.

Figure 1:
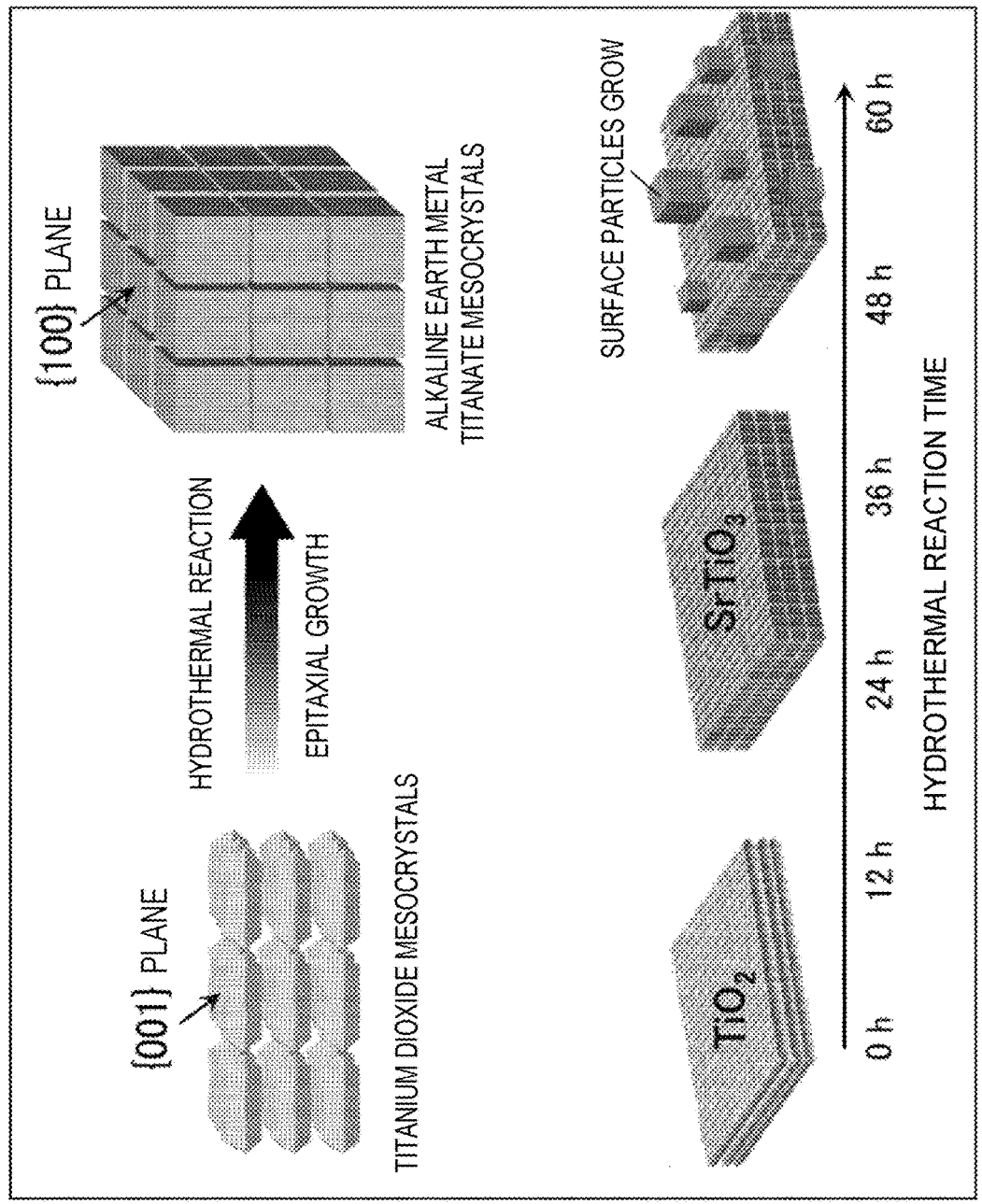
FIG. 1 is a diagram illustrating the formation and growth process of alkaline earth metal titanate mesocrystals.

The alkaline earth metal titanate crystal in the crystal laminate of the present invention has a unit lattice of cubic system, tetragonal system or orthorhombic system. Specifically, $SrTiO_3$ usually has a cubic system; $BaTiO_3$ usually has a tetragonal system; and $CaTiO_3$ usually has an orthorhombic system. The alkaline earth metal titanate crystal preferably has a perovskite structure like $SrTiO_3$ and $BaTiO_3$. The perovskite structure is formed by an epitaxial growth of an alkaline earth metal titanate crystal from titanium oxide mesocrystals behaving as a template (FIG. 1).

Specifically, alkaline earth metal atoms enter spaces defined in the titanium oxide mesocrystal and the perovskite structure is formed with the {001} planes of the titanium oxide mesocrystal as growth points of crystals to thereby make the crystal laminate of an alkaline earth metal titanate of the present invention. In other words, the produced crystal laminate can be called "mesocrystals of an alkaline earth metal titanate."

The "mesocrystal" used here refers to a superstructure in which crystal particles having so-called meso-size particle diameters are formed in a certain order. The meso-size used here refers to a size of usually 10 nm or more and preferably 100 nm or more, and usually 1,000 μm or less and preferably about 10 μm or less. The superstructure refers usually to a structure in which particles or crystals are orderly arrayed.

Then, the mesocrystal is usually a crystal in which particles or crystals are three-dimensionally highly orderly arrayed, and is different from a random aggregate of nanoparticles in that point. Specifically, the mesocrystal is the crystal whose structure can be confirmed by that orderly array can be observed from images by a scanning electron microscope (SEM) or the like, that orderly array is found from analysis of measurement results by a transmission electron microscope (TEM), specifically that uniform lattice fringes can be observed, and the like.

The crystal laminate of the present invention has a structure in which crystals of an alkaline earth metal titanate are orderly oriented and layered as described later.

Here, the above crystal system is not especially limited, and refers usually to a crystal system in which each crystal of the alkaline earth metal titanate is in a stable state.

The primary particle diameter of the alkaline earth metal titanate crystal as the constitutional unit of the crystal laminate of the present invention is not especially limited, and is usually 5 nm or more, preferably 10 nm or more, more preferably 20 nm or more and still more preferably 30 nm or more, and usually 500 nm or less, preferably 200 nm or less and more preferably 100 nm or less. This is because due to the primary particle diameter being in the above range, the band gap is rendered suitable and the amount of light absorbed becomes large, and preferably when the alkaline earth metal titanate crystal is utilized as a photocatalyst, a decrease in the absorption efficiency of ultraviolet light due to the quantum confinement effect is prevented. Therefore, primary particles of the alkaline earth metal titanate crystal of the crystal laminate of the present invention are nanoparticles.

The primary particle diameter of crystals in the present invention can be measured, for example, by powder X-ray diffractometry (using the Scherrer equation). The primary particle diameter can also be measured by a microscope such as a TEM. A measurement method thereof is not especially limited, and as the primary particle diameter, an average particle diameter determined by using the Scherrer equation in the powder X-ray diffractometry is usually used. The average particle diameter can be called "average primary particle diameter."

Further in the crystal laminate of the present invention, the alkaline earth metal titanate crystals are layered with an orientation in the {100} plane direction. That is, the crystal laminate has a form in which a plurality of layers are layered, in each of which primary particles of the alkaline earth metal titanate crystals are oriented in the {100} plane direction (FIG. 1). Due to having such {100} planes as crystal planes, the photocatalytic activity and the like can be improved.

In the crystal laminate of the present invention, it is preferable that the primary particle diameter of the crystals present on the surface of the crystal laminate (hereinafter, referred to as surface crystals) is more than the primary particle diameter of the crystals present in the interior of the crystal laminate (hereinafter, referred to as interior crystals). The primary particle diameter of the interior crystals is preferably 5 nm to 100 nm, more preferably 10 nm to 80 nm and still more preferably 10 nm to 50 nm. This is because due to the primary particle diameter being in the above range, the band gap can be rendered suitable and when the crystal laminate is used as a photocatalyst, the amount of light absorbed becomes large. On the other hand, the primary particle diameter of the surface crystals is preferably 30 nm to 500 nm, more preferably 40 nm to 500 nm and still more preferably 50 nm to 500 nm. Here, the primary particle diameter of the interior crystals is determined by analysis of a powder X-ray diffraction (XRD) pattern or an electron microscope image. Due to such differences in primary particle diameter between the surface crystals and the interior crystals, the surface crystal can form contact interfaces with a plurality of the interior crystals. It is considered that such formation of the contact interfaces of the surface crystal with the plurality of the interior crystals causes band bending of the conduction band and the valence band at the solid-liquid interfaces, and barriers formed at the interfaces make it difficult for electrons having moved to the surface crystal to return to the interior crystals.

Here, the surface crystals are crystals present in the outermost surface of the crystal laminate of the present invention. Then, the primary particle diameter of the surface crystals is observed usually by a scanning electron microscope. Specifically, an image (SEM image) obtained by the scanning electron microscope is observed and among the particles visually present in the outermost surface of the crystal laminate, particles the half or more of areas of which can be observed are selected and the particle diameter is determined from SEM images of these particles.

Further, the primary particle diameter of the interior crystals can be determined by observing a TEM image obtained by counting out the surface crystals or a SEM image of a portion of the crystal laminate of the present invention where the crystal laminate is physically broken and no surface crystals are present, or by applying the above Scherrer equation to the portion. The interior crystals are usually more uniform in the primary particle diameter than the surface crystals.

The width of the crystal laminate of the present invention is relatively large with respect to the thickness thereof. Specifically, the ratio (average width/average thickness) of the average width to the average thickness is preferably 10 to 100 and more preferably 20 to 50. Such a magnitude of the ratio of the average width/the average thickness suppresses random aggregation and can attain an orderly array.

The average width of the crystal laminate is preferably 1 µm or more, more preferably 2 µm or more, still more preferably 1 µm to 10 µm and further still more preferably 2 µm to 10 µm. The average thickness is preferably 50 nm or more, more preferably 50 nm to 2 µm and still more preferably 50 nm to 1 µm.

Here, in the crystal laminate of the present invention, the average width means, when the crystal laminate is regarded as a plate-shape crystal whose surface is square or rectangular, an average value of lengths of sides of the regarded square or rectangle. Further the average thickness of the crystal laminate of the present invention is, in the case of a plate-shape crystal, an average value of the thicknesses thereof, and in the case of a non-plate-shape crystal, an average value of the thicknesses of a plate-shape crystal as which the non-plate-shape crystal is regarded. These width and thickness can be measured, for example, by electron microscope observation (SEM or the like).

The specific surface area of the crystal laminate of the present invention is not especially limited, and is, from the viewpoint of the photocatalytic activity and the photocurrent, usually 10 $m^2/g$ or more, preferably 10 $m^2/g$ or more and 150 $m^2/g$ or less, more preferably 10 $m^2/g$ or more and 50 $m^2/g$ or less, and still more preferably 10 $m^2/g$ or more and 30 $m^2/g$ or less. The specific surface area of the crystal laminate of the present invention can be measured by a BET method or the like.

Then, the crystal structure of the present invention is a structure having alkaline earth metal titanate crystal nanoparticles on the surface of the crystal laminate, and can be deemed to be a structure having the alkaline earth metal titanate crystal nanoparticles on the surface of the mesocrystal of the alkaline earth metal titanate. The crystal orientation of the nanoparticles in the crystal structure may be in the same direction as that of the crystal laminate (FIG. 1). Due to that the crystal structure thus has the alkaline earth metal titanate crystal nanoparticles on the surface of the plate-shape crystal laminate, the photocatalytic activity is more improved. Here, that the crystal orientation of the nanoparticles is in the same direction as that of the crystal laminate means that the crystal orientation thereof is in the {100} plane direction.

It is preferable, from the viewpoint of the photocatalytic activity, the crystallinity and the like, that the primary particle diameter of the nanoparticles on the surface of the crystal laminate is twice or more the primary particle diameter of the crystals present in the interior of the crystal laminate. The primary particle diameter thereof is preferably 2 to 20 times, more preferably 5 to 10 times, that of the crystals on the surface of the crystal laminate. Specifically, the primary particle diameter of the nanoparticles is preferably 50 nm or more, more preferably 60 nm to 500 nm, still more preferably 80 nm to 500 nm and further still more preferably 100 nm to 300 nm.

The proportion of the nanoparticles on the surface of the crystal laminate is, in terms of surface coverage, preferably 20% to 80% and more preferably 40% to 60%.

The crystal laminate and the structure of the present invention can be produced, for example, by hydrothermally reacting a titanium oxide mesocrystal in which titanium oxide nanoparticles are orderly layered with an alkaline earth metal source.

Here, the titanium oxide mesocrystal to be used in the present invention is a crystal of titanium oxide described in Patent Literature 1 or 2, and is a superstructure in which nanoparticles of titanium oxide are orderly oriented and layered. Specifically, the titanium oxide mesocrystal refers to a crystal of titanium oxide in which the nanoparticles of the titanium oxide are oriented in the {001} planes and orderly arrayed and layered.

The average width of the titanium oxide mesocrystal is, though not especially limited, usually 10 nm or more and preferably 100 nm or more, and usually 10 μm or less and preferably 2 μm or less. In the titanium oxide mesocrystal, the ratio of the average width to the average thickness is high, and is usually 5 to 50 and preferably 10 to 20. Here, the average width and the average thickness of the titanium oxide mesocrystal are the same as those in the laminate of the present invention.

The specific surface area of the titanium oxide mesocrystal is usually 10 to 150 $m^2/g$.

Further the titanium oxide mesocrystal has pores in its structure and the pore diameter is usually 5 to 15 nm.

The titanium oxide mesocrystal being a raw material can be produced by a method described in Patent Literature 1 or 2. That is, the titanium oxide mesocrystal can be produced by (1) a method having a step of calcining, in an oxygen atmosphere at 400 to 700° C., a precursor aqueous solution containing $TiF_4$, $NH_4NO_3$, $NH_4F$ and water and having a content ratio of $TiF_4$ and $NH_4NO_3$ of 1:1 to 9 (in molar ratio), or (2) a method having a step of calcining, at 300 to 600° C., a precursor aqueous solution containing a titanium oxide precursor, an ammonia salt, a surfactant and water.

In the production method of (1), first, a step (first step) of calcining the precursor aqueous solution in an air atmosphere or an oxygen atmosphere at 250 to 700° C. may be carried out. Specifically, a liquid layer composed of the precursor aqueous solution may be formed on a substrate, and calcined in an air atmosphere or an oxygen atmosphere at 250 to 700° C. Examples of the substrate include silicon and various kinds of glass. By this first calcination, $NH_4TiOF_3$ crystals are obtained.

The obtained $NH_4TiOF_3$ crystals are calcined in an oxygen atmosphere at 400 to 700° C. (main calcination). By this main calcination, topotactic reaction is caused to thereby obtain a titanium oxide mesocrystal. At this time, the main calcination may be carried out in the same furnace for the above calcination in an air atmosphere, or in a different furnace. Then, when in the first calcination, the calcination is carried out in an oxygen atmosphere at 400 to 700° C., it is possible to obtain a titanium oxide mesocrystal without carrying out the main calcination. Here, in the present invention, it is preferable that the oxygen atmosphere is a 100% oxygen gas or a mixed gas atmosphere of oxygen and air in which the oxygen concentration is 90% or higher.

In the production method of (2), the precursor aqueous solution containing a titanium oxide precursor (for example, $TiF_4$), an ammonia salt, a surfactant and water may be calcined at 300 to 600° C. Specifically, a liquid layer composed of the precursor aqueous solution may be formed on a substrate and calcined at 300 to 600° C.

The substrate includes silicon and glass. The ammonia salt includes $NH_4NO_3$, $NH_4Cl$, $NH_4ClO_4$, $(NH_4)_2SO_4$ and $(NH_4)_2CO_3$. As the surfactant, preferable are polyethers having a polyoxyethylene skeleton, for example, polyoxyethylene polyoxypropylene copolymers.

The calcining temperature is preferably 300 to 600° C. and more preferably 400 to 500° C.

By subjecting the obtained titanium oxide mesocrystal and the alkaline earth metal source to a hydrothermal reaction, the crystal laminate and the structure of the present invention are obtained.

Here, the hydrothermal reaction refers usually to a reaction at a high temperature and high pressure using a solution containing mainly water as a solvent. Specifically, examples thereof include a method in which a water-soluble raw material is dissolved in water to prepare an aqueous solution, and the aqueous solution is put in a pressure-resistant vessel and reacted under a self-generated pressure at a temperature equal to or higher than the boiling point of water.

In the production methods in the present invention, an aqueous solution containing a metal source of an alkaline earth metal (hereinafter, an alkaline earth metal source) to be used for the objective materials is made coexist with the titanium oxide mesocrystal and subjected to a hydrothermal reaction.

The alkaline earth metal source is not especially limited, and an alkaline earth metal usually usable for the hydrothermal reaction or a compound containing it can be used, and examples thereof include alkaline earth metal hydroxides, alkaline earth metal chlorides, alkaline earth metal carbonates, alkaline earth metal sulfates and alkaline earth metal nitrates. Specifically, the compound includes strontium hydroxide, strontium chloride, strontium carbonate, strontium sulfate and strontium nitrate.

The molar ratio of the titanium oxide mesocrystal and the alkaline earth metal source to be used is not especially limited as long as the advantageous effects of the present invention are not impaired, and the titanium oxide mesocrystal and the alkaline earth metal source are usually used in nearly the same molar ratios in terms of amounts of the titanium oxide mesocrystal and the alkaline earth metal ion to be used. Specifically, it is preferable that the alkaline earth metal ion be excessive with respect to the titanium oxide mesocrystal, because vacancies of the alkaline earth metal ion in the crystals are unlikely to be generated and the improvement of the photocatalytic activity can be anticipated; and the ratio of the alkaline earth metal ion:the titanium oxide mesocrystal is, in molar ratio, more preferably 1.1:1 and still more preferably 1:1. This is because by setting the ratio to the above ratio, the formation of a solid solution can be prevented.

The conditions of the hydrothermal reaction are not especially limited, and well-known conditions thereof can suitably be used as long as the advantageous effects of the present invention are not impaired.

The solvent to be used in the hydrothermal reaction is usually a solvent containing water as a main component, and a solvent other than water, such as an alcohol, can also be used concurrently as long as the hydrothermal reaction is not inhibited.

The amount of water to be used for the hydrothermal synthesis is not especially limited, and is, in a molar ratio thereof to the total molar number of the titanium oxide mesocrystal and the alkaline earth metal source, usually 5 or higher, preferably 10 or higher, more preferably 50 or higher and still more preferably 100 or higher, and usually 1,000 or lower, preferably 500 or lower and more preferably 200 or lower.

The solvent other than water to be concurrently used in the hydrothermal reaction is not especially limited, and usually, a hydrophilic organic solvent can be used, and examples thereof include alcohols such as methanol, ethanol and ethylene glycol.

The amount of the solvent to be used is not limited as long as the hydrothermal reaction is not inhibited, and is, in molar ratio, usually $7 \times 10^{-5}$ or higher and 0.06 or lower to water.

In the hydrothermal reaction, for the purpose of promoting crystallization of the alkaline earth metal titanate on the titanium oxide crystal surface, a hydroxide of an alkali metal or an alkaline earth metal may be used, in addition to the alkaline earth metal source to be used in the present invention. The kind of the alkali metal or the alkaline earth metal to be used at this time may be the same as or different from the alkaline earth metal to be used in the present invention.

In the production method of the present invention, a mixture in which an aqueous solution containing the alkaline earth metal source and the titanium oxide mesocrystal are made coexist is heated to be subjected to a hydrothermal reaction.

The hydrothermal reaction is not especially limited, and is carried out by heating usually under a self-generated pressure or under a gas pressure not inhibiting the formation of the objective materials of the present invention to usually a temperature equal to or higher than the boiling point of water and by holding a predetermined reaction temperature. Further the hydrothermal reaction may use stirring or may be carried out statically.

The reaction temperature of the hydrothermal reaction is not especially limited, and is usually 100° C. or higher, preferably 150° C. or higher and more preferably 200° C. or higher, and usually 300° C. or lower and preferably 250° C. or lower.

The hydrothermal reaction is, though not especially limited, since usually it is carried out under a self-generated pressure or under a gas pressure as described above, usually carried out in a pressure-resistant vessel. The pressure-resistant vessel is not especially limited, and an autoclave or the like corresponding to the reaction scale and the like is usually used.

The reaction time for the hydrothermal reaction is not especially limited in the range in which the objective materials of the present invention can be obtained, and is usually 3 hours or longer, preferably 5 hours or longer and more preferably 10 hours or longer. The hydrothermal synthesis first forms the crystal laminate. The successive reaction grows alkaline earth metal titanate nanoparticles on the surface of the crystal laminate and forms the structure (FIG. 1).

The structure is formed by the reaction whose sum total reaction time is usually 24 hours or longer, preferably 36 hours or longer and more preferably 48 hours or longer. The upper limit of the reaction time can suitably be set according to a desired crystal laminate, and is not especially limited, and is usually 240 hours or shorter.

The hydrothermal reaction may be carried out at a stretch from the formation of the laminate to the formation of the structure, or these may be taken out on the way, and usually, the hydrothermal reaction is carried out at a stretch.

The production method of the present invention carries out the hydrothermal reaction by using the titanium oxide mesocrystals and the alkaline earth metal source to thereby obtain alkaline earth metal titanate crystals epitaxially grown with the titanium oxide mesocrystals as a template. Then the obtained crystal laminate is a crystal laminate whose crystals are oriented in the {100} plane direction (FIG. 1). Further, the progress of the hydrothermal reaction forms crystals of the alkaline earth metal titanate oriented in the same direction on the surface of the crystal laminate to thereby obtain the structure.

The structure is formed by repetition of dissolving-out and growing of particles present on the surface of the laminate.

After the finish of the hydrothermal reaction, the formed laminate or structure is separated from the mixture having been subjected to the hydrothermal reaction. A separation method is not especially limited, and is usually filtration, decantation or the like. The laminate or structure after the separation can suitably be taken out by a well-known method. The laminate or structure is usually subjected to water washing and drying at a temperature equal to or higher than room temperature and then taken out, whereby the laminate or structure can be obtained.

The crystal laminate and the structure of the alkaline earth metal titanate of the present invention, since as described above, they have a large specific surface area and an orderly array of the alkaline earth metal titanate crystals, and have a large size and are capable of being suppressed in aggregation, are high in the photocatalytic activity, the photoluminescence characteristic and the photoinduced charge separation characteristic, and are high in the electroconductivity as well. Further the present invention, because of being capable of producing the crystal laminate of the alkaline earth metal titanate by the very simple method, is excellent in the mass productivity. Hence, the present invention can be applied to various applications such as environment-cleaning photocatalysts, hydrogen-generating photocatalysts, dye-sensitized solar cells and lithium ion batteries, and is suitable for environment-cleaning photocatalysts and hydrogen-generating photocatalysts.

EXAMPLES

The present invention will be described specifically by way of Examples, but the present invention is not any more limited to these alone.

Analyzers and analysis conditions used in the Examples are shown below.

(Powder X-Ray Diffraction: XRD)
Apparatus: Smartlab manufactured by Rigaku Corp.
Measurement voltage: 40 kV
Measurement current: 200 mA
Light source: CuKα
(Transmission Electron Microscope: HRTEM)
Apparatus: JEM-ARM200F manufactured by JEOL Ltd.
Acceleration voltage: 200 kV
(Selected-Area Electron Diffraction) (SAED)
Apparatus: JEM-ARM200F manufactured by JEOL Ltd.
(Field Emission Electron Microscope: FESEM)
Apparatus: JSM-6330FT manufactured by JEOL Ltd.
(EDX)
Apparatus: JSM-6330FT manufactured by JEOL Ltd.
(BET Specific Surface Area Measurement)
Measurement by a nitrogen adsorption method
Apparatus: BELSORPmax manufactured by BEL Japan, Inc.
Condition: 77K
(Pore Volume and Pore Diameter Distribution)
Measurement by a BJH method
(Steady-State UV-Visible Diffuse Reflection Spectrum)
Apparatus: UV-3600 manufactured by Shimadzu Corp.
(Hydrogen Generation and Photohydrolysis Reaction)
Apparatus: Gas chromatograph GC-8A manufactured by Shimadzu Corp.
Column: Molecular Sieve 5A manufactured by Shimadzu GLC Ltd.
Light source: POT-365 manufactured by Asahi Spectra Co., Ltd.
[Analysis Conditions]
Amount of a photocatalyst powder: 1 mg
Volume of a solution: 2 mL
Excitation wavelength: 365 nm
Excitation light intensity: 100 mW/cm$^2$

Synthesis Example 1

(Synthesis of a Titanium Oxide Mesocrystal ($TiO_2$))

As a raw material for synthesizing a $SrTiO_3$ mesocrystal, first, a titanium oxide mesocrystal was synthesized according to a method described in International Publication No. WO2013/115213.

2 g of ammonium fluoride ($NH_4F$, manufactured by Wako Pure Chemical Industries, Ltd.), 1.6 g of titanium fluoride ($TiF_4$, manufactured by Sigma-Aldrich Corp.) and g of ammonium nitrate ($NH_4NO_3$, manufactured by Wako Pure Chemical Industries, Ltd.) were dissolved in 28 mL of distilled water to thereby obtain a colorless mixed solution. The mixed solution was dropped on a silicon wafer, and calcined in an electric furnace. The calcination involved raising the temperature from normal temperature at 10° C./min up to 500° C., thereafter calcining at 500° C. for 2 hours and thereafter cooling down to normal temperature to thereby obtain a white powder. The powder was three times washed with distilled water, and thereafter air dried at 80° C. for 8 hours in a drying machine to thereby obtain a titanium oxide mesocrystal (hereinafter, referred to as TMC in some cases).

Figure 2:
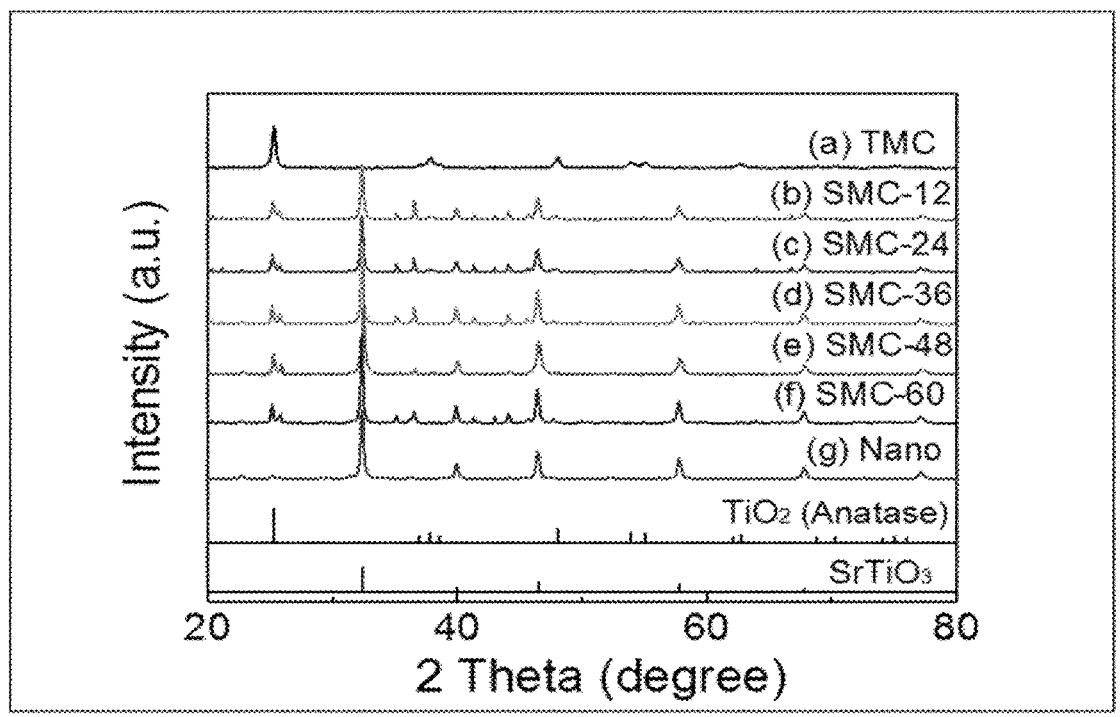
FIG. 2 shows XRD patterns of a titanium oxide mesocrystal (TMC), SMC-12, SMC-24, SMC-36, SMC-48, SMC-60, a strontium titanate nanocrystal (Nano), $TiO_2$ and $SrTiO_3$.

A powder X-ray diffraction (XRD) pattern of the obtained titanium oxide mesocrystal is shown in FIG. 2, and a transmission electron microscope (TEM) image thereof is shown in FIG. 3A.

From the powder X-ray diffraction (XRD) pattern of FIG. 2, it was confirmed that the titanium oxide mesocrystal was of an anatase type.

From the transmission electron microscope (TEM) image shown in FIG. 3A, it was confirmed that the titanium oxide mesocrystal was a plate-shape porous crystal, and from a selected-area electron diffraction (SAED) pattern, it was confirmed that the titanium oxide mesocrystal was a single crystal of an anatase-type titanium oxide along the {001} planes.

Example 1

(Synthesis of a Strontium Titanate ($SrTiO_3$) Mesocrystal)

1 g of the titanium oxide mesocrystal obtained in Synthesis Example 1 was suspended in 10 mL of ethanol. The suspension liquid of the titanium oxide mesocrystal was slowly pored under stirring in a solution in which 3.3 g of strontium hydroxide octahydrate ($Sr(OH)_2 \cdot 8H_2O$, manufactured by Wako Pure Chemical Industries, Ltd.) was added to 20 mL of distilled water. Then, under continuous stirring, 10 mL of a 5 M sodium hydroxide (NaOH) aqueous solution, 10 mL of a polyethylene glycol (mass-average molecular weight Mw: 400, 0.8% by mass in water) aqueous solution and 10 mL of water were added in order to the above resultant suspension liquid. The obtained suspension liquid was put in a 100 mL Teflon® vessel; and an argon gas was blown into the solution for about 30 min and the vessel was sealed. The vessel was put in a stainless-steel pressure-resistant vessel and heated in an electric furnace to thereby carry out a hydrothermal reaction. The hydrothermal reaction involved raising the temperature from normal temperature at 1° C./min up to 200° C., and successively reacting at 200° C. for 24 hours. After the finish of the reaction, the resultant was cooled down to normal temperature, and thereafter, a produced material in the Teflon® vessel was collected. The produced material was several times washed with distilled water, and thereafter air dried at 80° C. for 8 hours in a drying machine to thereby obtain a powdery substance. The obtained powdery substance is called SMC-24 hereinafter.

An XRD pattern of the SMC-24 is shown in FIG. 1, and a TEM image thereof is shown in FIG. 3C.

Example 2

A powdery substance (hereinafter, SMC-48) was obtained by the same synthesis as in Example 1, except for altering the reaction time (hydrothermal reaction time) at 200° C. in Example 1 to 48 hours.

An XRD pattern of the SMC-48 is shown in FIG. 1, and a TEM image thereof is shown in FIG. 3E.

Example 3

A powdery substance (hereinafter, SMC-12) was obtained by the same synthesis as in Example 1, except for altering the reaction time at 200° C. in Example 1 to 12 hours.

An XRD pattern of the SMC-12 is shown in FIG. 1, and a TEM image thereof is shown in FIG. 3B.

Example 4

A powdery substance (hereinafter, SMC-36) was obtained by the same synthesis as in Example 1, except for altering the reaction time at 200° C. in Example 1 to 36 hours.

An XRD pattern of the SMC-36 is shown in FIG. 1, and a TEM image thereof is shown in FIG. 3D.

Example 5

A powdery substance (hereinafter, SMC-60) was obtained by the same synthesis as in Example 1, except for altering the reaction time at 200° C. in Example 1 to 60 hours.

An XRD pattern of the SMC-60 is shown in FIG. 1, and a TEM image thereof is shown in FIG. 3F.

Comparative Example 1

XRD of strontium titanate nanocrystals (particle diameter: 20 to 40 nm, manufactured by Sigma-Aldrich Corp., and hereinafter, called Nano) was measured as in the Examples and the result thereof is shown in FIG. 2.

<Evaluations>

Test Example 1: The Specific Surface Area

Figure 4:
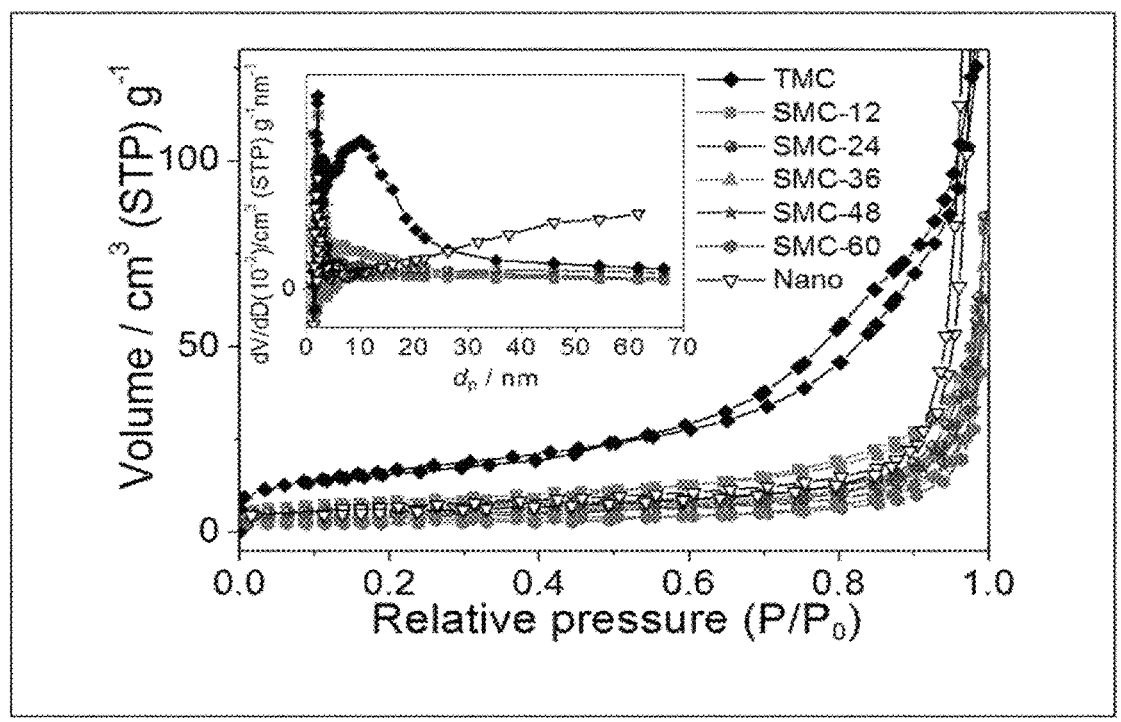
FIG. 4 shows results of specific surface area measurement of TMC, SMC-12, SMC-24, SMC-36, SMC-48, SMC-60 and Nano.

The specific surface areas of the crystals of Synthesis Example 1, Examples 1 to 5 and Comparative Example 1 were measured by the above-mentioned BET method. The results are shown in FIG. 4 and Table 1.

TABLE 1

| | Sample Name | Specific Surface Area ($m^2/g$) | Pore Diameter (nm) | Pore Volume ($cm^3/g$) | Particle Diameter (nm) |
|---|---|---|---|---|---|
| Example 1 | SMC-24 | 21 | 10 | 0.06 | 33 |
| Example 2 | SMC-48 | 15 | 11 | 0.04 | 36 |
| Synthesis Example 1 | TMC | 57 | 8 | 0.16 | 22 |
| Example 3 | SMC-12 | 28 | 8 | 0.06 | 31 |
| Example 4 | SMC-36 | 18 | 11 | 0.05 | 37 |
| Example 5 | SMC-60 | 10 | 15 | 0.03 | 42 |
| Comparative Example 1 | Nano | 23 | 2 | 0.14 | 31 |

Test Example 2: The Pore Diameter and the Pore Volume

The pore diameters and the pore volumes of the crystals of Synthesis Example 1, Examples 1 to 5 and Comparative Example 1 were measured by the BJH method. The results are shown in an inset in FIG. 4 and Table 1.

Test Example 3: The X-Ray Diffraction

The characteristics of the crystals of Examples 1 to 5 and Comparative Example 1 were measured by the powder XRD. Further the crystals of Synthesis Example 1, Examples 1 to 5 and Comparative Example 1 were evaluated for the particle diameters of the strontium titanate and titanium oxide nanocrystals constituting the crystals, by using the Scherrer equation using line broadenings of XRD peaks. The results are shown in FIG. 2 and Table 1.

Test Example 4: The Electron Microscope Observation

The structures of the strontium titanate mesocrystals of Examples 1 to 5 and Comparative Example 1 were observed by a TEM. The results are shown in FIGS. 3B to 3F of FIG. 3. In any case, the strontium titanate nanocrystals were orderly arrayed. Further, pores of several nanometers to several tens of nanometers were generated. From the SAED patterns of the mesocrystals, cubic crystals along the {100} planes were confirmed.

Figure 5:
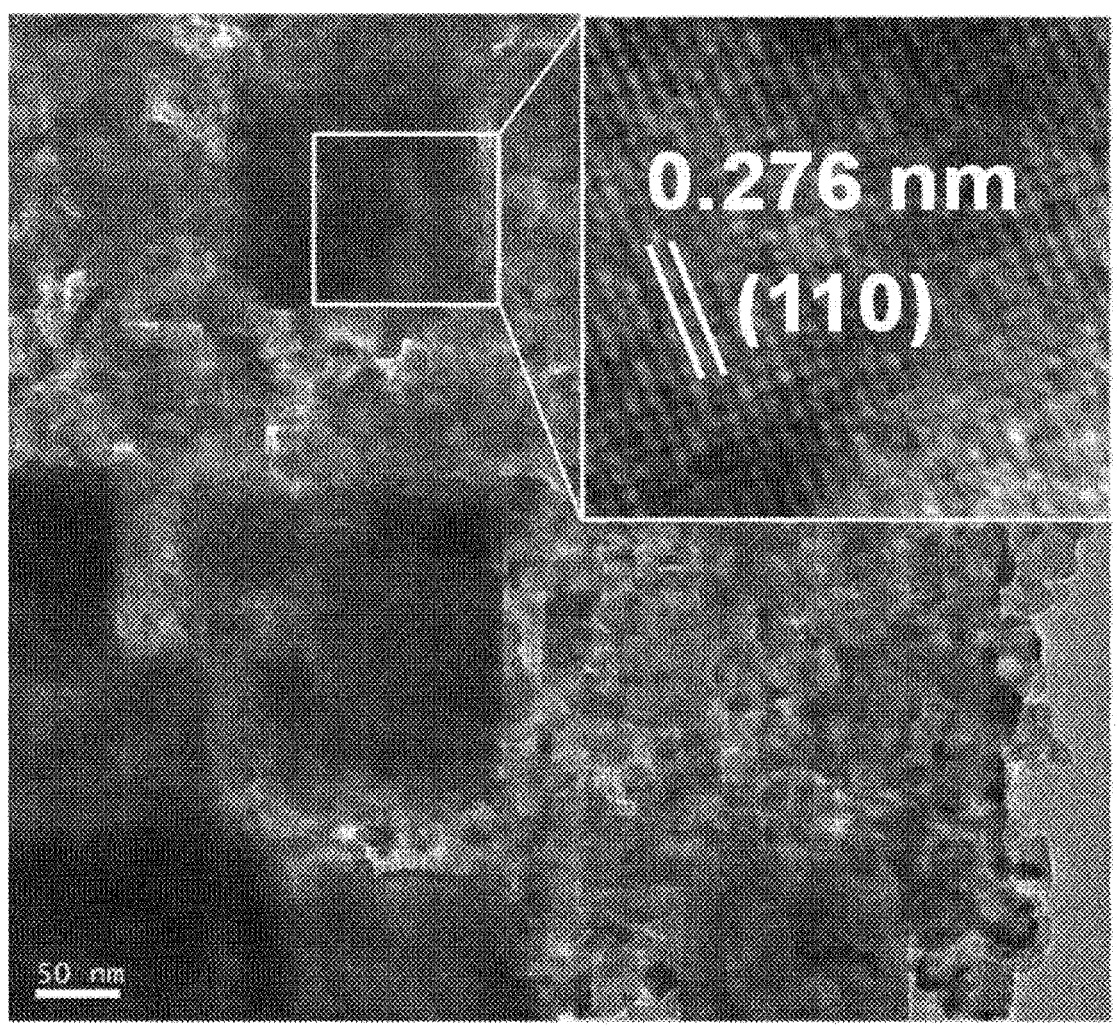
FIG. 5 shows an HRTEM image of a nanocrystal in the mesocrystal (SMC-48) of Example 2.

FIG. 5 shows a high-resolution transmission electron microscope (HRTEM) image of nanocrystals of the mesocrystal of Example 2. From the result that the single crystal lattices indicated atomic planes of the (110) crystal planes having a lattice spacing of about 0.276 nm, it was confirmed that in the strontium titanate mesocrystals of the present invention, constituting nanocrystals were arrayed orderly in the state that almost all thereof exposed the {100} plane on the surface thereof. Further, many defects and pores were formed on the surface (FIG. 5).

Figure 6:
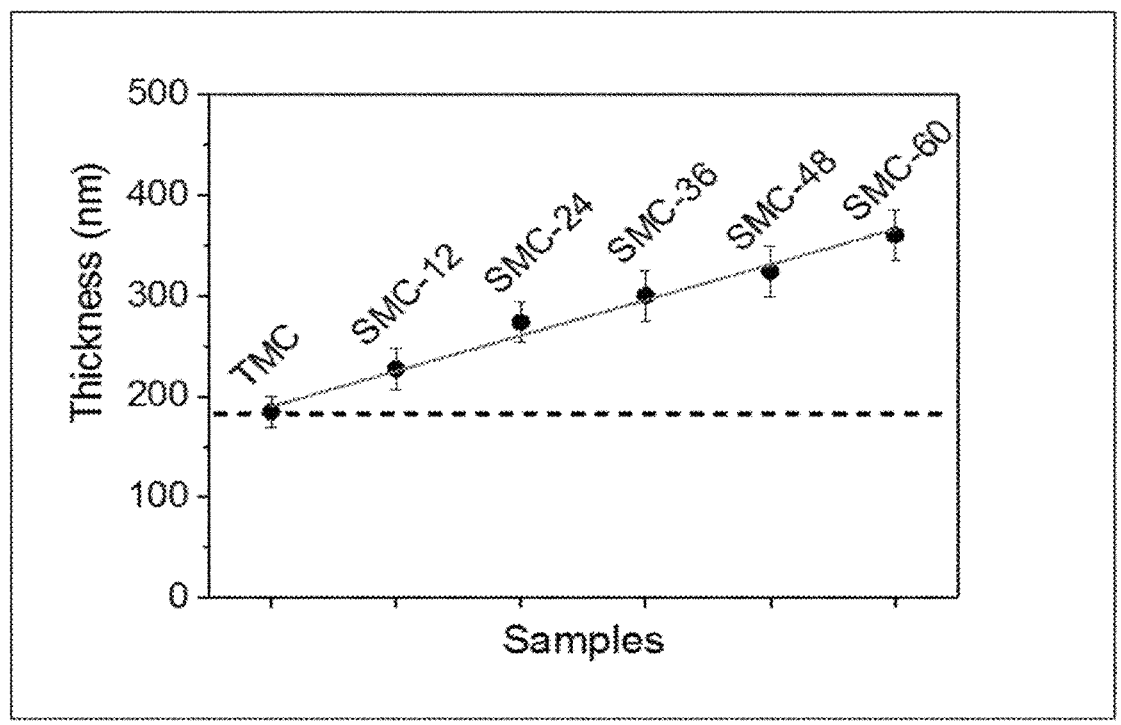
FIG. 6 shows average thicknesses of TMC and strontium titanate mesocrystals (SMC-12, SMC-24, SMC-36, SMC-48, SMC-60).

From analysis of a scanning electron microscope (SEM) image, the average thickness of the strontium titanate mesocrystal of Example 1 was about 250 nm, and distributed in the range of 200 to 300 nm (FIG. 6). The average thickness of the strontium titanate mesocrystal of Example 2 was about 300 nm. From comparison of Examples 3 to 5 and Comparative Example 1, it was confirmed that the average thickness of the mesocrystals increased depending on the time of the hydrothermal reaction.

Figure 7B:
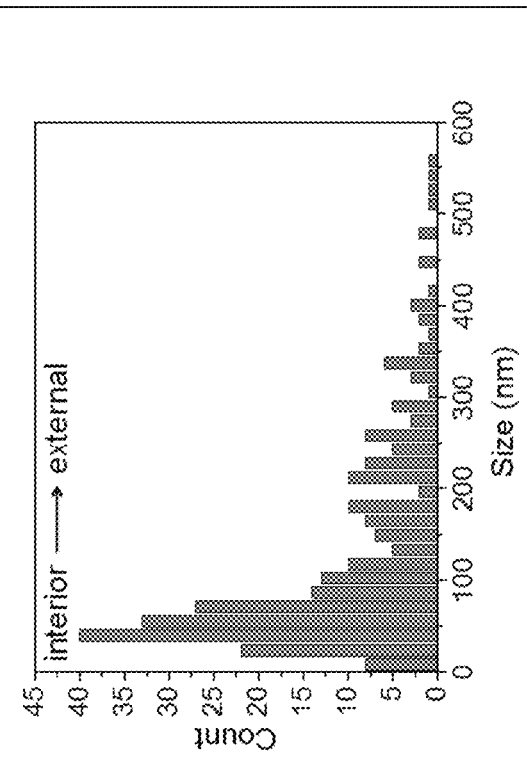
FIG. 7A is a SEM image and FIG. 7B shows a distribution of crystal size, of the strontium titanate mesocrystal (SMC-48) of Example 2.
Figure 7A:
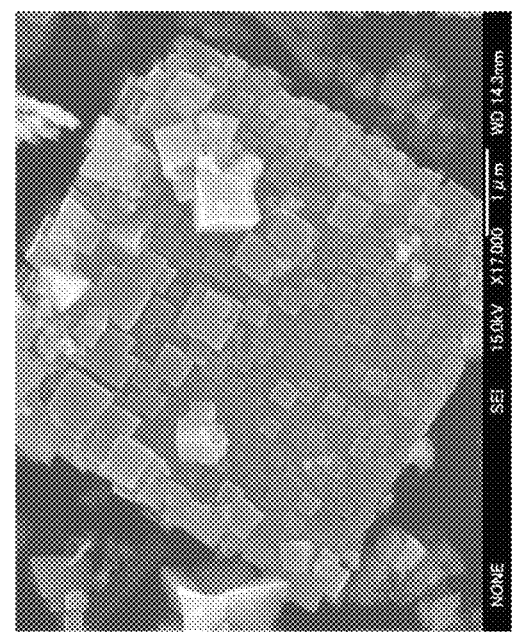

A SEM image of the strontium titanate mesocrystal of Example 2 is shown in FIG. 7A. It was confirmed that while the primary particle diameter of the nanocrystals of a mesocrystal interior was 30 to 60 nm, the crystals on the surface or in the vicinity of the surface were grown to several hundreds of nanometers, specifically, to 50 nm to 500 nm (FIG. 7B).

Test Example 5: The Elemental Analysis

Figure 8:
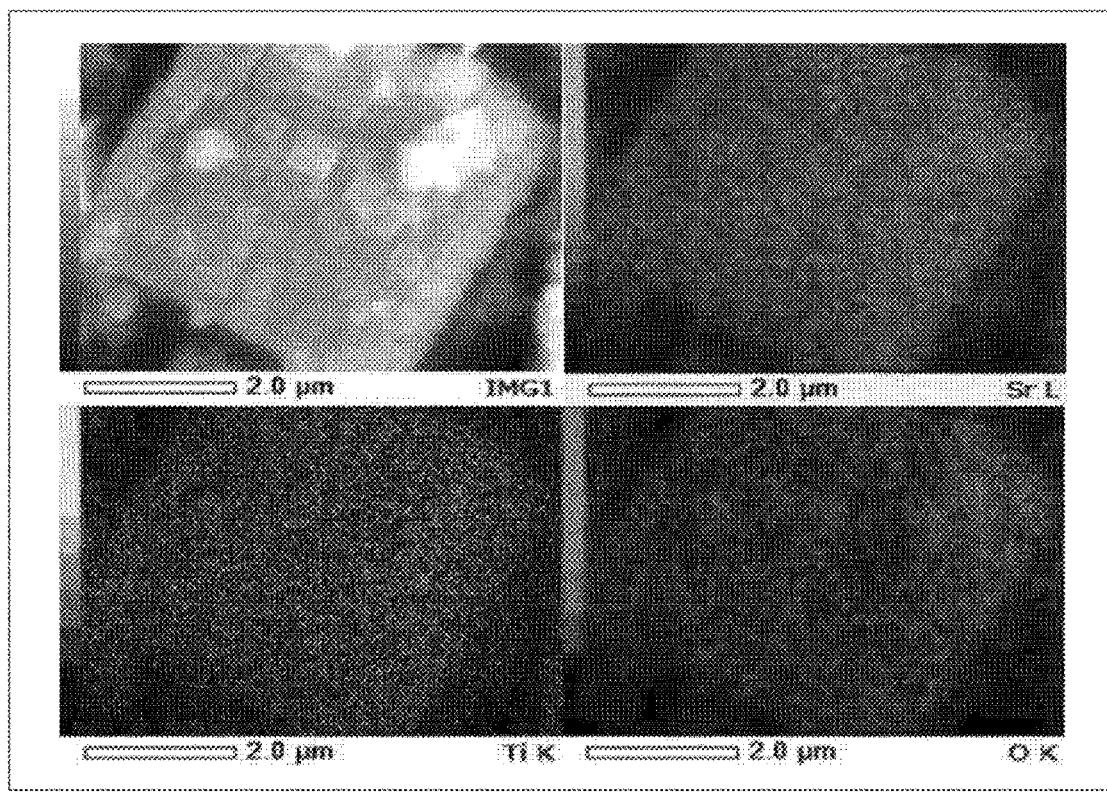
FIG. 8 shows EDX images of the strontium titanate (SMC-48) of Example 2.
Figure 9:
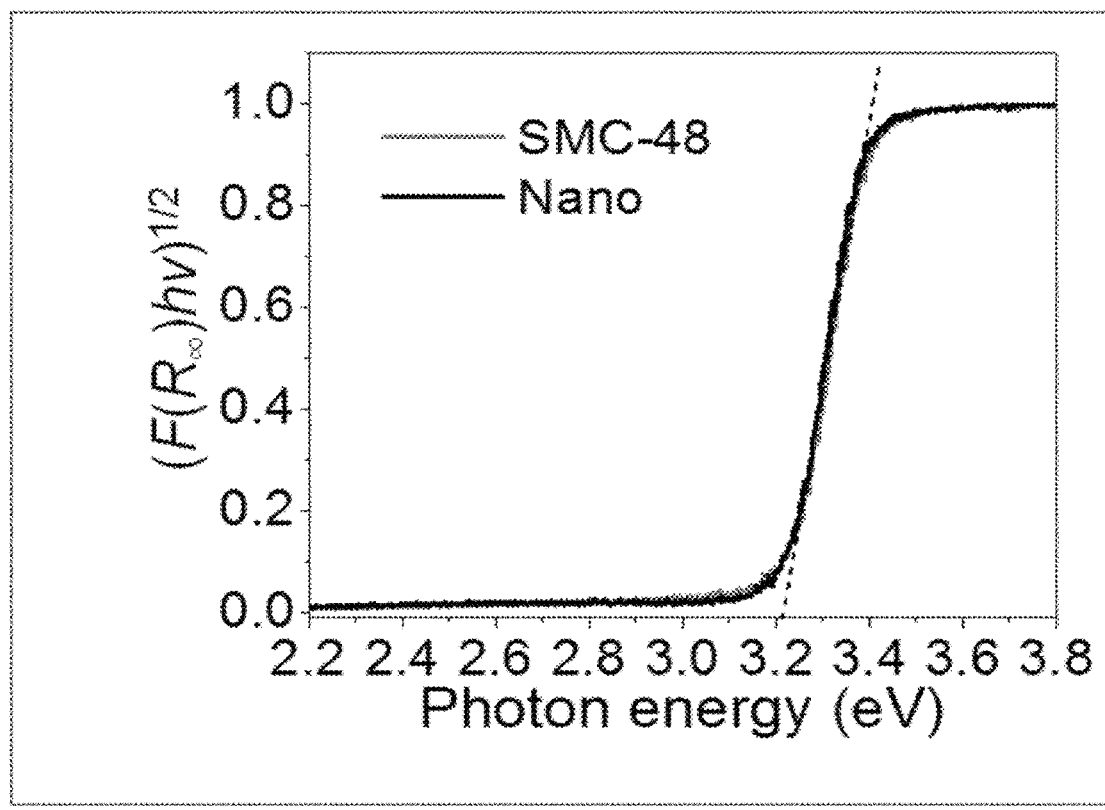
FIG. 9 shows a steady-state diffuse reflection spectrum of the strontium titanate (SMC-48) of Example 2.

Elemental analysis of the strontium titanate mesocrystal of Example 2 was carried out by energy dispersive X-ray spectroscopy (EDX) (FIG. 8). As a result, no elements other than the constitutional elements of the strontium titanate mesocrystal were detected.

Test Example 6: The Light Absorption Characteristic

From a steady-state diffuse reflection spectrum, the band gap of the strontium titanate mesocrystal of Example 2 was calculated to be about 3.2 eV. Since the band gap was at nearly the same level as in the strontium titanate nanocrystal of Comparative Example 1, it is implied also from this fact that no impurities mingled in the strontium titanate mesocrystal of Example 2.

Test Example 7: The Photohydrogen Generation

The amount of photohydrogen generated under irradiation of ultraviolet light in the presence of methanol as a hole scavenger was measured.

1 mg of each crystal of Examples 1 to 5 and Comparative Example 1 was added to 2 mL of distilled water or 5-mol/L sodium hydroxide aqueous solution containing 20% by mass of methanol, and each dispersion liquid was transferred to a quartz cuvette. The quartz cuvette was shaken for 10 min; thereafter an argon gas was blown in the dispersion liquid for 20 min; and the quartz cuvette was sealed with a rubber stopper. A photohydrogen generation reaction was initiated by irradiation of ultraviolet light at room temperature. The dispersion liquid was stirred during the reaction. 0.1 mL of a gas in an upper space in the quartz cuvette was extracted with a syringe every 1 hour, and quantitatively analyzed by gas chromatography.

Figure 10:
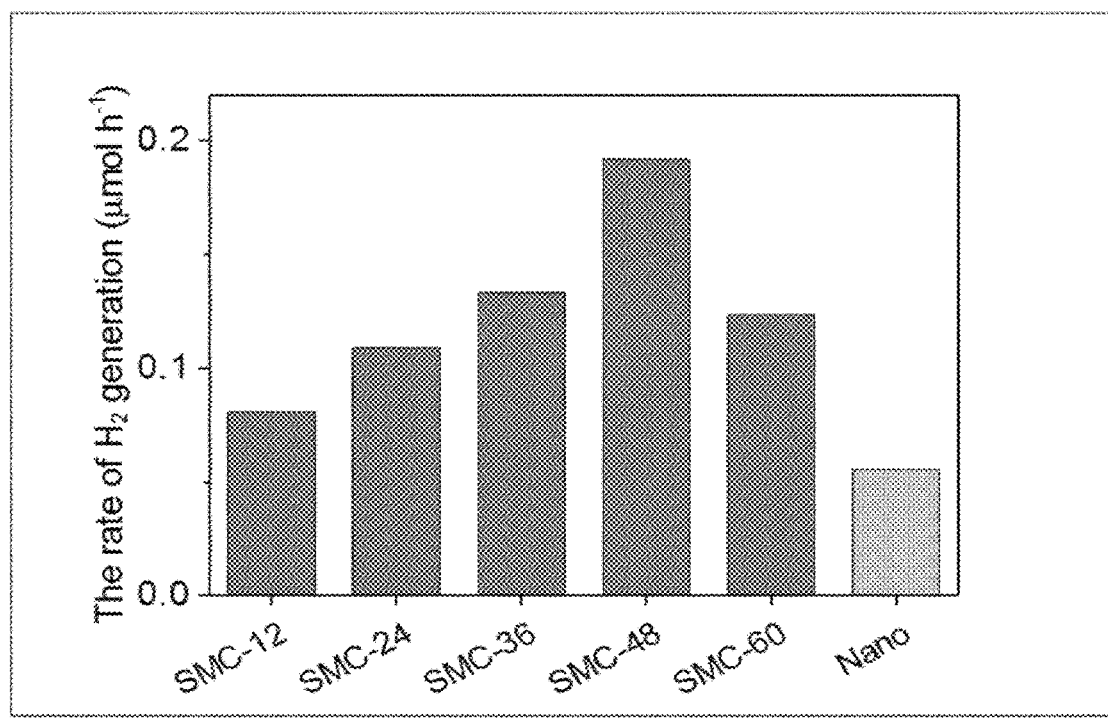
FIG. 10 shows the photocatalytic activity of strontium titanate mesocrystals of Examples 1 to 5.

The results are shown in FIG. 10. In the strontium titanate mesocrystals of Examples 1 to 5, better photocatalytic activity was observed than in the strontium titanate nanocrystal of Comparative Example 1. Among these, Example 2 in which the synthesis was carried out with a hydrothermal reaction time of 48 hours exhibited the best photocatalytic activity. As the solvent, distilled water containing 20% by mass of methanol was used.

Figure 11:
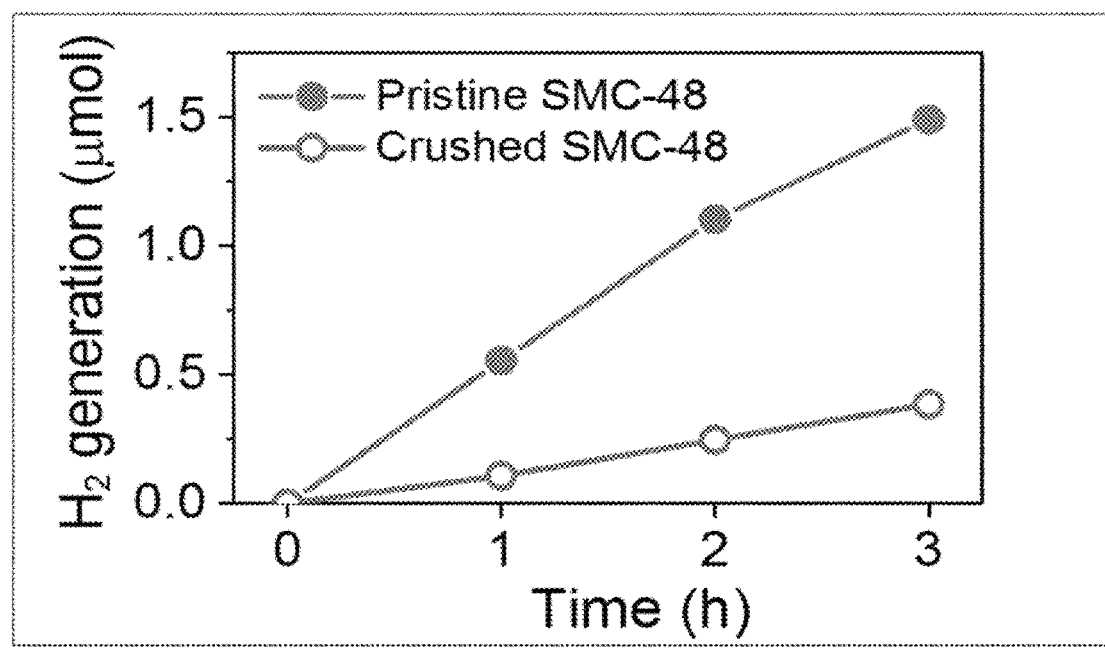
FIG. 11 shows the amount of hydrogen generated by photohydrolysis reaction using the strontium titanate mesocrystal of Example 2.

As shown in FIG. 11, from the result that the amount of hydrogen generated was remarkably reduced by crushing the strontium titanate mesocrystal of Example 2 by using an agate mortar, the importance of the mesocrystal structure in the photocatalytic action was confirmed. As the solvent, a 5-mol/L sodium hydroxide aqueous solution containing 20% by mass of methanol was used.

Figure 12:
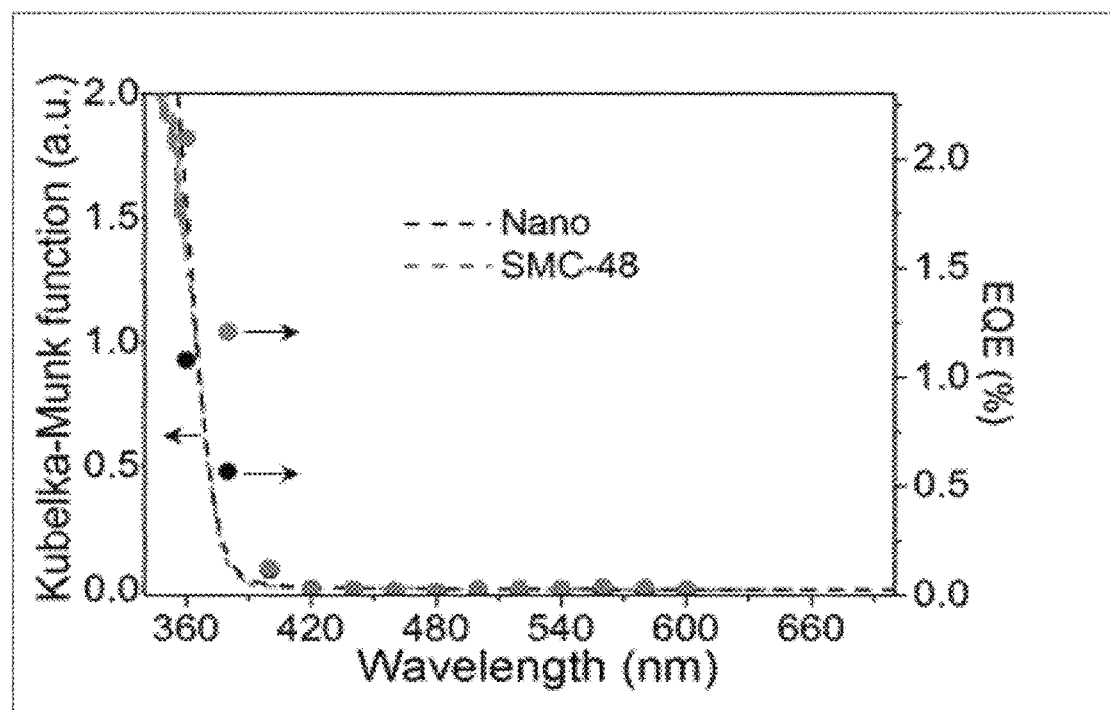
FIG. 12 shows the excitation wavelength dependency of the external quantum efficiency in photohydrogen generation using the strontium titanate mesocrystal of Example 2.

The excitation wavelength dependency of the external quantum efficiency (EQE) in the photohydrogen generation was examined by irradiating the dispersion liquid with a light monochromatized with a 10 nm-spectrum width band-pass filter (manufactured by Thorlabs, Inc.) from a xenon light source (HAL-320W, manufactured by Asahi Spectra Co., Ltd.). The results obtained for Example 2 and Comparative Example 1 are shown in FIG. 12. From the result that the excitation wavelength dependencies of EQE coincided nearly with the diffuse reflection spectra of the crystals, it was confirmed that hydrogen was generated by the photocatalytic action of strontium titanate.

Test Example 8: The Photohydrolysis

By having a rhodium-chromium composite oxide as a hydrogen generation promoter carried, the generation of hydrogen and oxygen by photohydrolysis under ultraviolet light irradiation was measured. The light energy conversion efficiency was defined as a proportion of photons utilized for the reaction to the number of incident photons.

0.3 g of each of the crystals of Example 2 and Comparative Example 1 was added to 3 mL of distilled water containing rhodium sodium chloride ($Na_3RhCl_6$, manufactured by Sigma-Aldrich Corp.) and chromium nitrate nonahydrate ($Cr(NO_3)_3 \cdot 9H_2O$, manufactured by Wako Pure Chemical Industries, Ltd.). The dispersion liquid was put in a glass vessel, and heated on a hot plate to thereby completely evaporate the solvent under stirring. An obtained residual solid material was sintered in air in an electric furnace at 350° C. for 1 hour to thereby have the rhodium-chromium composite oxide carried on the surface of each crystal. The amount carried was made to be 1% by mass to the catalyst carrier.

1 mg of each of the crystals of Example 2 and Comparative Example 1 carrying the rhodium-chromium composite oxide was added to 2 mL of distilled water, and each dispersion liquid was transferred to a quartz cuvette. The quartz cuvette was shaken for 10 min; thereafter, an argon gas was blown in the dispersion liquid for 20 min; and the quartz cuvette was sealed with a rubber stopper. A photohydrolysis reaction was initiated by irradiation of ultraviolet light at room temperature. The dispersion liquid was stirred during the reaction. 0.1 mL of a gas in an upper space in the quartz cuvette was extracted with a syringe every 1 hour, and quantitatively analyzed by gas chromatography.

Figure 13:
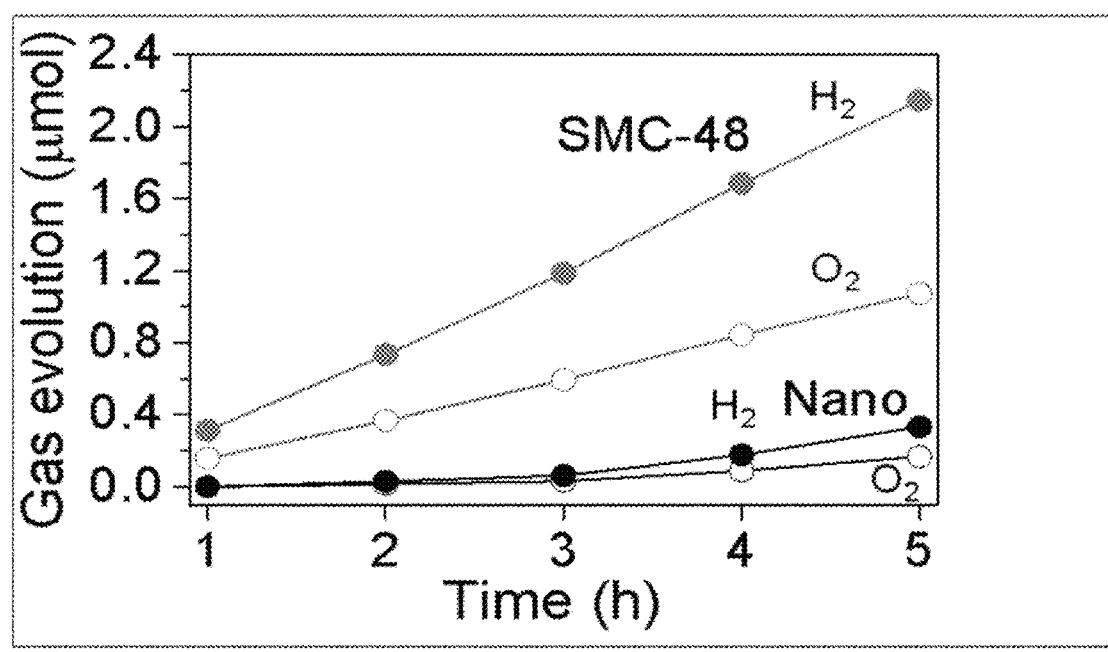
FIG. 13 shows the generation ratios of hydrogen and oxygen in photohydrolysis reaction using the strontium titanate mesocrystal of Example 2 or a crystal of Comparative Example 1 (Nano).

The results are shown in FIG. 13. The strontium titanate mesocrystal of Example 2 progressed the water splitting reaction under ultraviolet light irradiation at a light energy conversion efficiency of about 7%. From the result that the amounts of substance of hydrogen and oxygen generated were 2:1, it was confirmed that the water splitting reaction was caused stoichiometrically. From the result that when the experiment was carried out on the strontium titanate nanocrystal of Comparative Example 1 which had not been mesocrystallized, the efficiency was below 1%, the reaction efficiency can be deemed to be improved by one digit due to the mesocrystallization.

Figure 14:
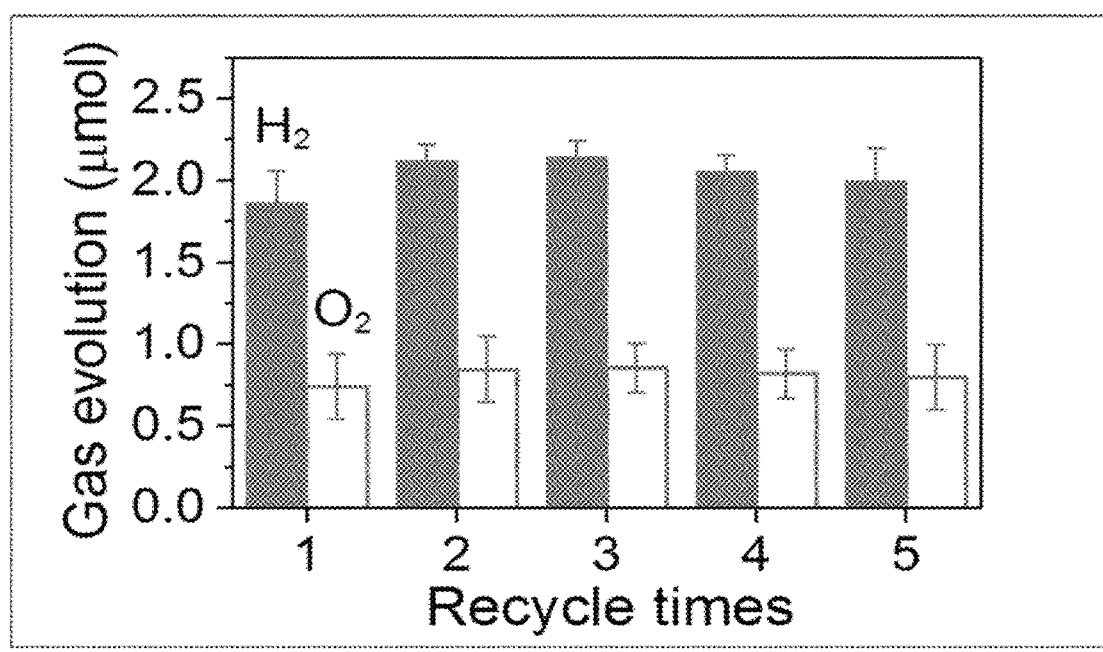
FIG. 14 shows the activity when the photohydrolysis reaction using the strontium titanate mesocrystal of Example 2 is carried out continuously.

As shown in FIG. 14, form the result that for the strontium titanate mesocrystal of Example 2, even when the photohydrolysis reaction for 5 hours was successively five times carried out, no change was observed in the reaction efficiency, the high stability of the mesocrystal photocatalyst was confirmed.

Test Example 9: The Time-Resolved Diffuse Reflection Spectroscopy

In order to evaluate the life of the charge separation state, a time-resolved reflection spectroscopy was carried out. The measurement is for evaluation criteria of the efficiency of the photocatalytic reaction.

The time-resolved diffuse reflection spectrum was measured by a pump-probe method. Pulse light obtained by a titanium sapphire regenerative amplifier (Spitfire, manufactured by Spectra-Physics, Inc.) was split and converted into two, one of which was pump light and the other was probe light. For the pump light, ultraviolet light (5 µJ/pulse) of 330 nm obtained by an optical parametric amplifier (OPA-800CF-1, manufactured by Spectra-Physics, Inc.) was used. For the probe light, broadband white light generated by using a sapphire crystal was used. The probe light scattered by a sample powder was spectrally resolved by a polychromator (MS3504, manufactured by SOL instruments, Ltd.), and thereafter detected by an InGaAs array detector. The experiment was wholly carried out at room temperature.

Figure 15:
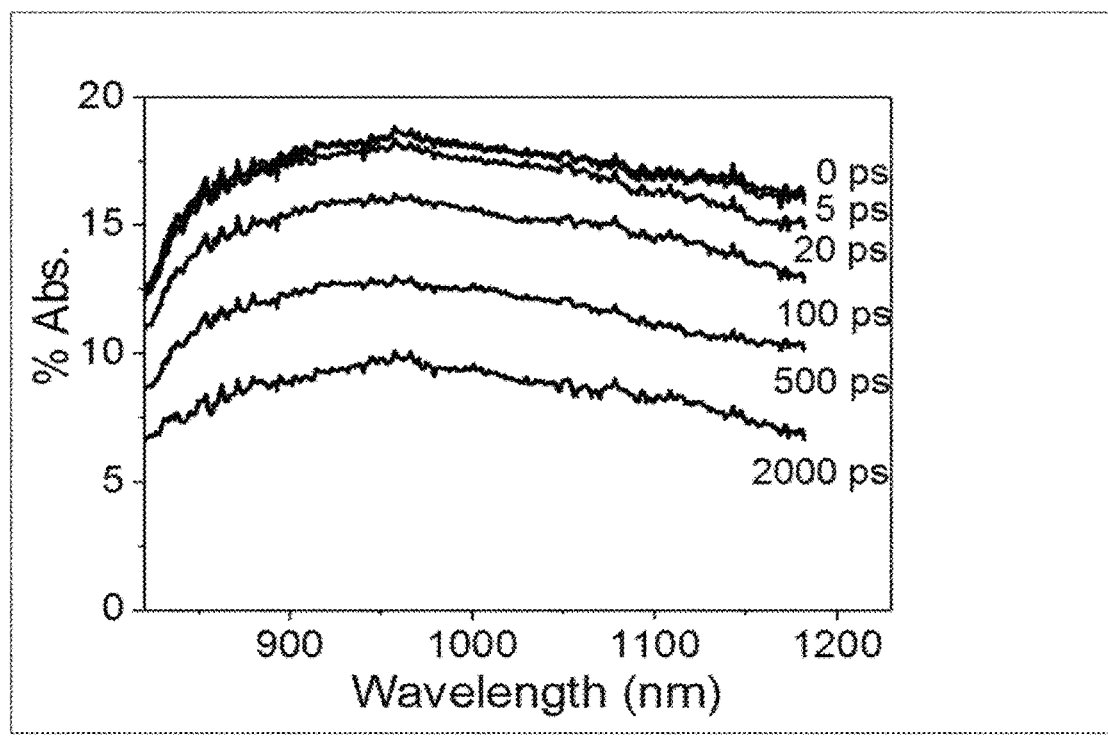
FIG. 15 shows results of time-resolved reflection spectroscopy of the strontium titanate mesocrystal of Example 2.

As shown in FIG. 15, in the strontium titanate mesocrystal of Example 2, the transient absorption was confirmed in a broad wavelength range in the near-infrared region. The transient absorption is mainly due to captured electrons.

Figure 16:
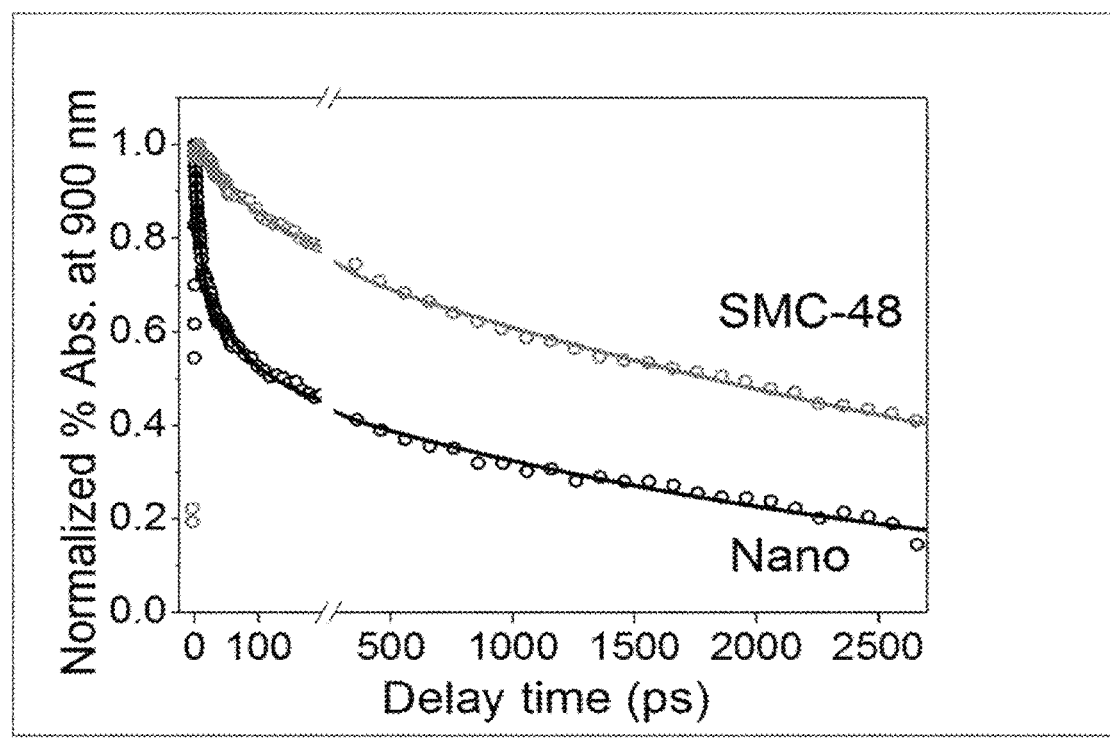
FIG. 16 shows the life of captured electrons of the strontium titanate mesocrystal of Example 2.

As shown in FIG. 16, the captured electrons in the strontium titanate mesocrystal of Example 2 had a remarkably longer life than in the nanocrystal of Comparative Example 1, which becomes one of causes of the high photocatalytic activity of the mesocrystal.

Test Example 10: The Single Particle Light Emission

Photoluminescence is observed in the visible light band by recombination of photogenerated electrons and holes. In order to evaluate the photoluminescence characteristic of the strontium titanate mesocrystals, single particle light emission imaging was carried out. The light emission imaging is a powerful method capable of observing the surface reaction at a high spatial resolution.

The single particle light emission imaging was carried out by using a Ti-E inverted fluorescence microscope, manufactured by Nikon Instech Co., Ltd. The sample was excited by continuous wave laser light of 405 nm (OBIS 405LX, manufactured by Coherent Inc.) condensed by an objective lens (CFI Plan Apo λ 100×H, manufactured by Nikon Instech Co., Ltd.). The photoluminescence was detected by an electron multiplication-function CCD camera (Evolve 512, manufactured by Photometrics). The scattered light was removed by using a long-path filter (BLP01-458R, manufactured by Semrock).

Figures 17A, 17B:
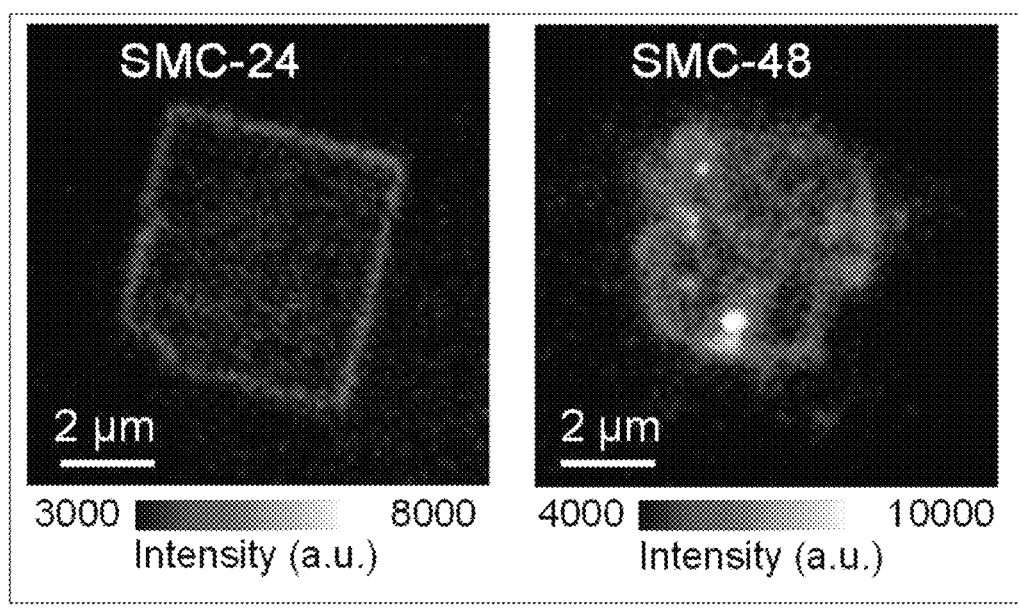
FIGS. 17A and 17B Single particle light emission images of the strontium titanate mesocrystal of Example 2.

As shown in FIG. 17A, in the strontium titanate mesocrystal of Example 1, the light emission intensity, though being slightly high at crystal edges, was nearly uniform in the whole crystal. By contrast, in the strontium titanate mesocrystal of Example 2, in which particles on the surface were grown to several hundreds of nanometers, shown in FIG. 17B, a plurality of regions of several hundreds of nanometers exhibiting very high light emission intensities were observed. These results indicate that electrons generated by light irradiation diffuse in the mesocrystal interior having a high structural regularity and are easily captured by the large crystals present on the surface.

Due to differences in primary particle diameter between the surface crystals and the interior crystals, the surface crystal can form contact interfaces with a plurality of the interior crystals. It is considered that such formation of the contact interfaces of the surface crystal with the plurality of the interior crystals causes band bending of the conduction band and the valence band at the solid-liquid interfaces, and barriers formed at the interfaces makes it difficult for electrons having moved to the surface crystal to return to the interior crystals. The consideration is that the spatial separation of sites where charges are transported and sites where the catalytic reaction occurs and the accumulation of charges at the reaction sites are effective for construction of a highly efficient light energy conversion system.

The invention claimed is:
1. A structure having an alkaline earth metal titanate crystal nanoparticle on a surface of a crystal laminate,
wherein the crystal laminate comprises:
a crystal of an alkaline earth metal titanate as a constitutional unit, wherein:
the crystal is a cubic crystal, a tetragonal crystal or an orthorhombic crystal;
the crystal has a primary particle diameter of 500 nm or less; and
the crystal is layered with an orientation in a {100} plane direction thereof,
wherein
the crystal laminate has an average width of more than 1 µm,
the crystal laminate has an average thickness of 50 am or more, the crystal laminate has a ratio (average width/average thickness of the average width to the average thickness of 10 to 100, the crystal present on a surface of the crystal laminate has a primary particle diameter of 2 to 20 times more than a primary particle diameter of the crystal present in an interior of the crystal laminate, the crystal laminate has a specific surface area of 10 $m^2/g$ or more, a crystal orientation of the alkaline earth metal titanate crystal nanoparticle is in the same direction as that of the crystal laminate, the alkaline earth metal titanate crystal nanoparticle has a primary particle diameter of twice or more a primary particle diameter of the crystal present on the surface of the crystal laminate, a proportion of the nanoparticles on the surface of the crystal laminate is, in terms of surface coverage, 20% to 80%, and the alkaline earth metal titanate crystal nanoparticle has a primary particle diameter of 50 nm or more.

2. The structure according to claim 1, wherein the proportion of the nanoparticles on the surface of the crystal laminate is, in terms of surface coverage, from 40% to 60%.

3. A method of producing the structure of claim 1, the method comprising:
(i) subjecting a titanium oxide mesocrystal having a titanium oxide nanoparticle orderly layered therein and an alkaline earth metal atom source to a hydrothermal reaction under a reaction time of 3 hours or longer and at a reaction temperature of 100° C. to 300° C., under the condition that an amount of water to be used for hydrothermal synthesis is, in a molar ratio thereof to a total molar number of the titanium oxide mesocrystal and the alkaline earth metal source, from 5 to 1,000, to form the crystal laminate, and;
(ii) applying the formed crystal laminate to successive reaction, which is a hydrothermal reaction under a sum total reaction time of 24 hours or longer and at a reaction temperature of the same as for the hydrothermal reaction in the (i) subjecting step, for growing alkaline earth metal titanate nanoparticles on the surface of the formed crystal laminate to form the structure, wherein in the titanium oxide mesocrystal, a ratio of an average width to an average thickness is 5 to 50, and wherein in the structure of the titanium oxide mesocrystal, a pore diameter is 5 to 15 nm, and wherein the amount of water to be used for hydrothermal synthesis is, in a molar ratio thereof to the total molar number of the titanium oxide mesocrystal and the alkaline earth metal source, from 50 to 200, the reaction time of the (i) subjecting step is 5 hours or longer and the sum total reaction time of the (ii) applying step is 36 hours or longer, and the sum total reaction time of the second step is 240 hours or shorter.

* * * * *